(12) United States Patent
Paxton et al.

(10) Patent No.: US 8,252,109 B2
(45) Date of Patent: Aug. 28, 2012

(54) PROCESS FOR THE PRODUCTION OF CEMENT

(75) Inventors: Colin Paxton, Gillingham (GB); Michael Weichinger, Vienna (AT)

(73) Assignee: Lafarge, Paris (FR)

( * ) Notice: Subject to any disclaimer, the term of this patent is extended or adjusted under 35 U.S.C. 154(b) by 585 days.

(21) Appl. No.: 12/513,824

(22) PCT Filed: Oct. 30, 2007

(86) PCT No.: PCT/IB2007/004257
§ 371 (c)(1),
(2), (4) Date: May 6, 2009

(87) PCT Pub. No.: WO2008/059378
PCT Pub. Date: May 22, 2008

(65) Prior Publication Data
US 2010/0037804 A1    Feb. 18, 2010

(30) Foreign Application Priority Data
Nov. 13, 2006 (EP) .................................. 06291766

(51) Int. Cl.
*C04B 7/43* (2006.01)

(52) U.S. Cl. ........ 106/739; 106/738; 106/743; 106/758; 106/761; 106/762; 423/438

(58) Field of Classification Search ................. 106/738, 106/739, 743, 758, 761, 762; 423/438
See application file for complete search history.

(56) References Cited

U.S. PATENT DOCUMENTS

| | | | | |
|---|---|---|---|---|
| 1,784,840 A | * | 12/1930 | La Forge ..................... | 106/739 |
| 3,607,327 A | * | 9/1971 | Imperato, Jr. ............... | 106/753 |
| 4,066,470 A | | 1/1978 | Brachthauser et al. | |
| 4,913,742 A | | 4/1990 | Kwech | |
| 5,293,751 A | | 3/1994 | Asai | |

FOREIGN PATENT DOCUMENTS

| | | |
|---|---|---|
| GB | 384060 | 12/1932 |
| WO | WO 02/083591 | 10/2002 |
| WO | WO 2006/113673 | 10/2006 |

* cited by examiner

*Primary Examiner* — Paul Marcantoni
(74) *Attorney, Agent, or Firm* — Pillsbury Winthrop Shaw Pittman, LLP

(57) ABSTRACT

A process for the production of cement which includes the calcination of calcium carbonate-containing raw meal in a calciner heated by combustion of a carbon-containing fuel with a gas including oxygen and from 0 to 80% by volume of carbon dioxide, and substantially free of nitrogen, and isolating the gas produced by combustion and calcination in the calciner.

8 Claims, 4 Drawing Sheets

PROCESS FOR THE PRODUCTION OF CEMENT

CROSS-REFERENCE TO RELATED APPLICATIONS

This is the U.S. National Stage of PCT/IB2007/004257, filed Oct. 30, 2007, which in turn claims priority to European Patent Application No. 06291766.1, filed Nov. 13, 2006, the entire contents of both applications are incorporated herein by reference in their entireties.

FIELD

This invention relates to a process for the production of cement in which part of the carbon dioxide produced is separated from other gases involved in the production process in a gas stream having an enhanced carbon dioxide content.

BACKGROUND

The production of cement generates substantial quantities of carbon dioxide. The carbon dioxide is produced in two ways. One of the materials in cement production is calcium carbonate. The calcium carbonate is heated to calcine it and loses carbon dioxide to form calcium oxide. The burning of carbon-containing fuel to generate the high temperatures required to produce cement also generates carbon dioxide. For environmental reasons it is desirable to reduce the amount of carbon dioxide released into the atmosphere.

The raw materials for cement production, which include calcium carbonate, are generally mixed, dried and ground to form a "raw meal" which is then processed to produce clinker, the main component of cement. In a preheating step the raw meal is heated to just below calcination temperature. It then passes to a calciner where further heating takes place and, as the temperature rises, calcination of the calcium carbonate to calcium oxide takes place and carbon dioxide is released. The calcined raw meal then passes to a kiln where it is heated to higher temperatures to produce clinker which is subsequently ground to yield cement powder.

Air is generally used as a source of oxygen for combustion of fuel to provide heat for the calciner and the kiln. The principal gases present in air are nitrogen (about 80% by volume) and oxygen (about 20% by volume).

Combustion of a solid or liquid, carbon-based fuel can be summarised in the equation:

$$C + O_2 = CO_2$$

The volume of the solid or liquid fuel is negligible relative to that of the gases involved. One volume of oxygen produces one volume of carbon dioxide. Nitrogen present in the air used for combustion is not involved in the combustion. Following the combustion the gas stream contains about 80% by volume of nitrogen and about 20% of carbon dioxide. The overall volume of gas is increased by the heat generated. When a solid or liquid hydrocarbonaceous fuel is burned combined hydrogen present in the fuel combines with oxygen according to the equation:

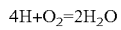

$$4H + O_2 = 2H_2O$$

The water generated is in the gaseous state and is therefore present as a gaseous diluent of the carbon dioxide which is also produced. One volume of oxygen produces two volumes of gaseous water, the volume of the solid or liquid hydrocarbonaceous fuel being negligible relative to the volumes of gas involved. Gaseous water therefore contributes to an increase in the volume of gas formed by combustion compared to the volume of oxygen used. It is, however, readily separated from the carbon dioxide by simple cooling at a later stage in the operation. The overall volume of gas increases at the combustion stage with the increased temperature.

In the combined gases from the calcination process and from fuel combustion the carbon dioxide is generally present at from 14 to 33% by volume. The other principal constituent of the gas is nitrogen. Although the mixture of nitrogen and carbon dioxide could be separated and the carbon dioxide stored to prevent its release into the atmosphere the energy required to effect the separation is too high to make it worthwhile. If the nitrogen in air is removed and the resulting substantially pure oxygen used to burn a fuel, nitrogen is then not present as a diluent of the carbon dioxide produced.

If oxygen were used instead of air in burning all of the fuel required to produce cement additional cost might be incurred. In addition, combustion processes involving undiluted oxygen generally proceed with great vigour and generate very high temperatures capable of damaging or shortening the working life of production plant.

SUMMARY

The present invention seeks to reduce the emissions of carbon dioxide in the production of cement by using oxygen to burn only part of the fuel required in the cement-producing process and by separating the gas from the calcination stage from the gas from the kiln where clinkering takes place. The process may be used in the known dry process and in other processes for example the wet process. The use of oxygen, substantially pure or in admixture with carbon dioxide, in the calciner in conjunction with separation of the gas leaving the calciner offers environmental benefit.

The present invention accordingly provides a process for the production of cement which comprises the calcination of calcium carbonate-containing raw meal in a calciner heated by combustion of a carbon-containing fuel with a gas comprising oxygen and from 0 to 80% by volume of carbon dioxide, and substantially free of nitrogen, and isolating the gas produced by combustion and calcination in the calciner.

The flow of raw meal is generally similar to that in known processes for the production of cement. In such processes raw meal is heated in a preheater, for example a cyclone preheater, and is then introduced into a calciner, for example a pot calciner. Raw meal from the calciner is fed to a kiln. The preheater receives hot gas from the kiln and from the calciner.

In the process of the invention the gas from the calciner comprises a high proportion of carbon dioxide and is suitable, after appropriate treatment (for example cooling and dedusting) for storage or other use without release into the atmosphere.

The temperature of the carbon dioxide leaving the calciner is generally 800 to 900° C. The gas can be cooled, for example in a steam generator to generate electrical power. In order to minimise ingress of gas, which might reduce the percentage of carbon dioxide underpressure in the steam generator, is preferably avoided. The steam generator is preferably operated at an overpressure. The gas is then preferably dedusted prior to storage, for example, geological storage underground, eg in depleted oil or gas fields, or another use without release into the atmosphere.

The gas used to support fuel combustion preferably comprises at least 50% by volume of oxygen, for example at least 80%, preferably at least 90%, most preferably at least 95%. It is substantially free of nitrogen. It may comprise carbon dioxide, for example carbon dioxide recycled from the gas stream leaving the calciner. Such carbon dioxide may be introduced into the calciner separately from the oxygen-enriched gas or mixed with it. Oxygen may be introduced, for example with gas recycled from the calciner, generally at the bottom of the calciner. It may also be introduced at one or more points substantially level with the or each burner. Carbon dioxide and fuel may each also be introduced at one or more inlet points.

The presence of a plurality of inlet points in the calciner facilitates regulation of the temperature which might otherwise rise too high when the gas for fuel combustion comprises a high proportion of oxygen. Calcination of calcium carbonate to calcium oxide and carbon dioxide is an endothermic process: introduction of raw meal at one or a plurality of inlets can therefore be used to regulate temperature.

The amount of oxygen is controlled to ensure substantially complete combustion of fuel but to minimise excess oxygen.

Raw meal for calcination is generally dried in a preheating step. Calcined raw meal from the calciner is fed to a kiln for clinkering. Heat for the kiln is provided by burning fuel in an oxygen-containing gas, generally in air.

The heat required for preheating is generally provided by gas from the kiln. The maximum temperature during preheating is preferably controlled to avoid premature calcination and release of carbon dioxide. The temperature of the raw meal leaving the preheater is preferably less than about 800° C., generally less than about 750° C. The fuel used for calcination and for the kiln may be the same or different but are generally the same. If gas from the calcination is to be stored or disposed of, for example underground, the presence of minor amounts of sulphur and/or nitrogen oxides may be permissible in which case the fuel may contain sulphur and/or nitrogen-containing materials. Such fuels are generally cheaper. The content of sulphur in the fuel is preferably low (less than 6%). The content of nitrogen in the fuel is preferably low (less than 1.5%). If high purity carbon dioxide is required from the calcination, fuel which is substantially free from nitrogen and sulphur is preferably used. The raw meal is then also preferably substantially free from these elements. The raw meal preferably has a low content of calcium sulphate and pyritic sulphur.

The fuel used is preferably coal or petcoke. Waste fuel may be used but close control of combustion is then required.

The process according to the invention permits the production of a gas stream from the calciner having an enhanced carbon dioxide content. The invention seeks to provide such a gas stream comprising at least 90% by volume of carbon dioxide, preferably at least 95%, for example 92 to 93%.

Calcination is generally effected by introducing preheated raw meal into a gas stream, generally a rising gas stream. The gas stream is generally produced by burning fuel. If necessary in order to support the raw meal in the ascending gas stream part of the carbon dioxide-containing gas leaving the calciner may be recirculated and reintroduced into the ascending gas stream.

The speed of the gas stream required to support the raw meal depends on, for example, the fineness of the meal. The fineness of the raw meal used in the process of the invention can vary: known finenesses can be used. Raw meal having a small particle size is preferably used to facilitate transport of the meal by the gas stream. A meal leaving 10% by weight residue on a 75 micron (200 mesh) sieve is advantageously used. Typically one cubic metre of gas (volume at standard temperature and pressure) passing through the calciner will support 2 kg of raw meal. When the gas stream is recirculated gaseous water which may be generated by fuel combustion may also contribute to the volume of the recirculated gas. The concentration of carbon dioxide in the calciner is then correspondingly reduced.

The residence time of raw meal in the calciner is relatively short, for example 5-6 seconds. The presence of a high concentration of carbon dioxide in the gas stream carrying the raw meal may reduce the speed at which carbon dioxide is evolved by calcination at a given temperature. If the concentration of carbon dioxide in the gas stream is high it may be desirable to raise the temperature to secure the desired level of calcination from the raw meal during its presence in the calciner. The concentration of carbon dioxide in the gas stream through the calciner is generally maintained at a level as low as possible consistent with effective transport of meal through the calciner and the desired level of calcination.

The level of calcination in the meal leaving the calciner is generally at least 60%, for example 70 to 80%, preferably at least 90%. It may be desirable to control the level of calcination to 80% or more by weight, leaving up to 20% residual carbon dioxide in the meal, for example a level of 92 to 95%, leaving 5 to 8% residual carbon dioxide in the raw meal leaving the calciner.

The absence of materials such as alkalis, sulphates and chlorides in the gas stream in the calciner facilitates its operation. In known processes such materials may be present, originating in gas from the kiln The calciner used in the process of the invention may be of known design, for example a pot calciner. Leakage of air into the calciner is preferably avoided. This is facilitated by controlling pressure conditions in the overall cement production process. In order to reduce the ingress of air during operation of the process it is desirable to maintain a slightly reduced pressure in the calciner relative to pressure in the kiln inlet. The reduction is generally less than 1 millibar, for example about 0.3 millibar.

A new calciner for operation in accordance with the invention may be retrofitted to operate in parallel with an existing calciner. The supply of raw meal from the preheater is then divided between the new and existing calciners. All or part, for example 20% or more, preferably up to 50% of the meal may be diverted to the new calciner. The overall release of carbon dioxide into the atmosphere from the calcinations step can thereby be reduced approximately in proportion to the feed of raw meal to the new and existing calciners. In a similar way the invention may be fitted to an existing suspension preheater kiln process.

BRIEF DESCRIPTION OF THE DRAWINGS

The invention is further illustrated in the accompanying drawings in which.

DETAILED DESCRIPTION

Figure 1:
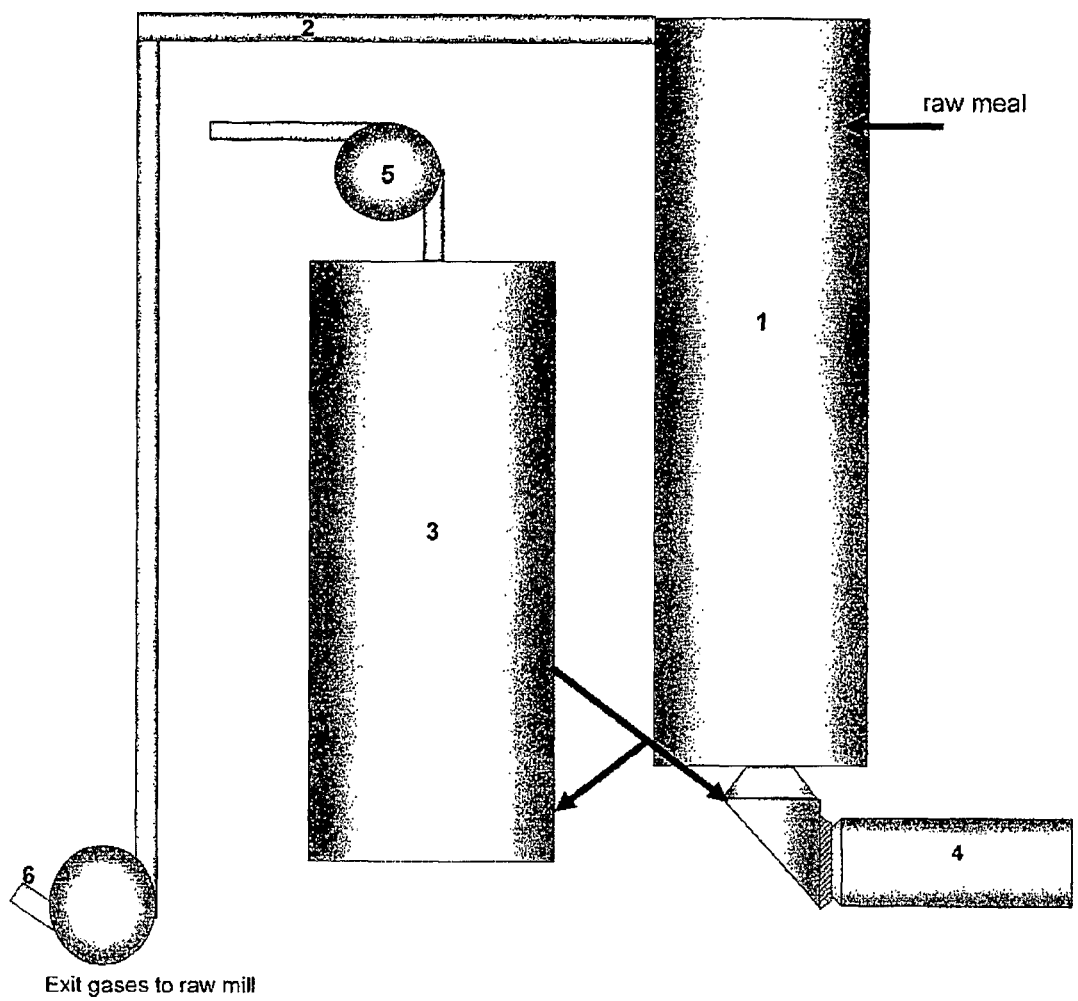
FIG. 1 illustrates in diagrammatic form the process of the invention.

Referring to FIG. 1, raw meal is fed to a preheater (1). The preheated meal is fed from the preheater (1) to a calciner (3)

as indicated by the arrow between them. Hot gas from the preheater (1) exits along line (2). Precalcined meal from the calciner (3) is fed to a kiln (4) as indicated by the arrow. Gases containing a high percentage of carbon dioxide leave the calciner (3) via a fan (5). Gases from the line (2) exit via a fan (6) to the mill for producing raw meal.

Figure 2:
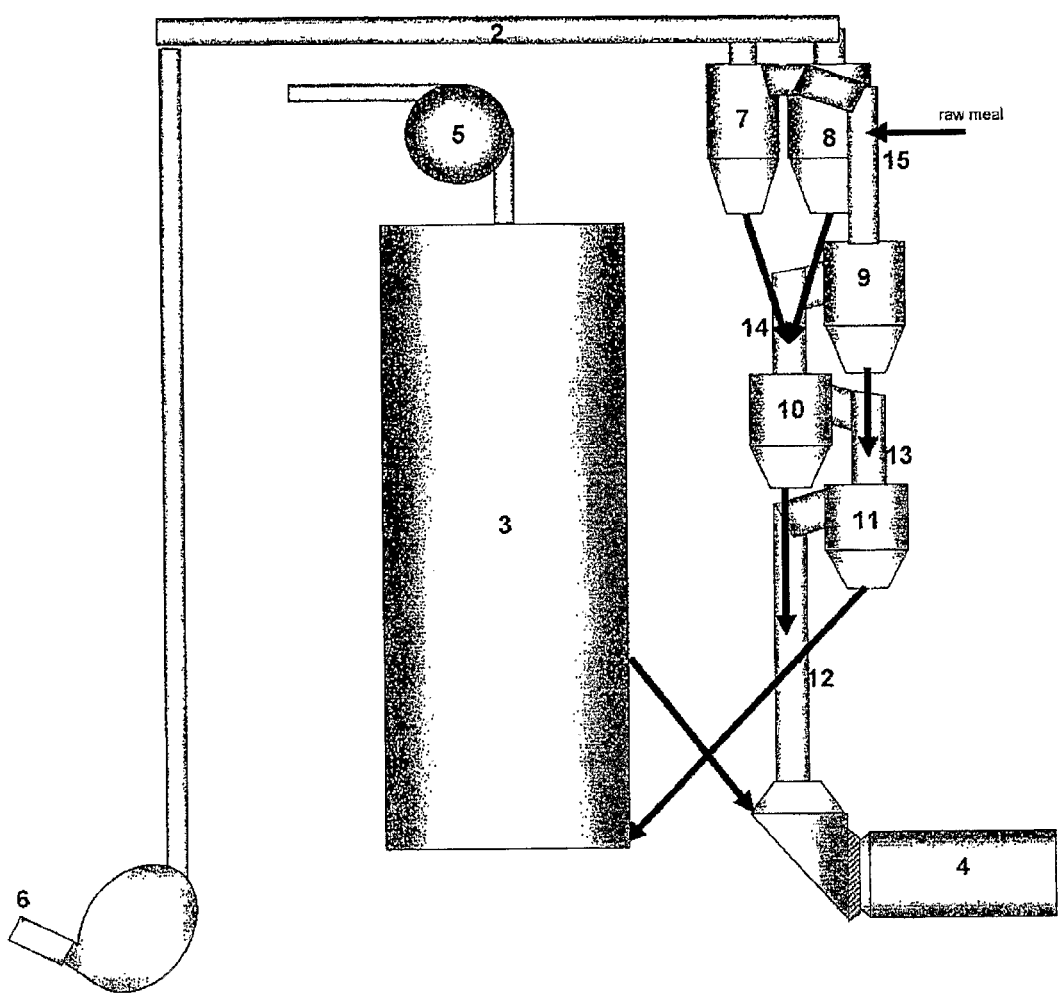
FIG. 2 illustrates in more detail a preheater for carrying out a process according to the invention.

Referring to FIG. 2, components (2), (3), (4), (5), and (6) are as in FIG. 1. The raw meal passes successively through cyclones (7), (8), (9), (10) and (11) and then into the calciner (3). Hot gas from the kiln (4) flows through riser (12) to cyclone (11); hot gas from cyclone (11) flows through riser (13) to cyclone (10); hot gas from cyclone (10) flows through riser (14) to cyclone (9); hot gas from cyclone (9) flows through riser (15) to cyclones (7) and (8).

Fresh raw meal is fed into riser (15) and is lifted into cyclones (7) and (8); meal from cyclones (7) and (8) is fed into riser (14) and is lifted by the hot gas into cyclone (9); meal from cyclone (9) is fed into riser (13) and is lifted into cyclone (10); meal from cyclone (10) is fed into riser (12) and is lifted into cyclone (11); the meal proceeds from cyclone (11) to the calciner (3).

Figure 3:
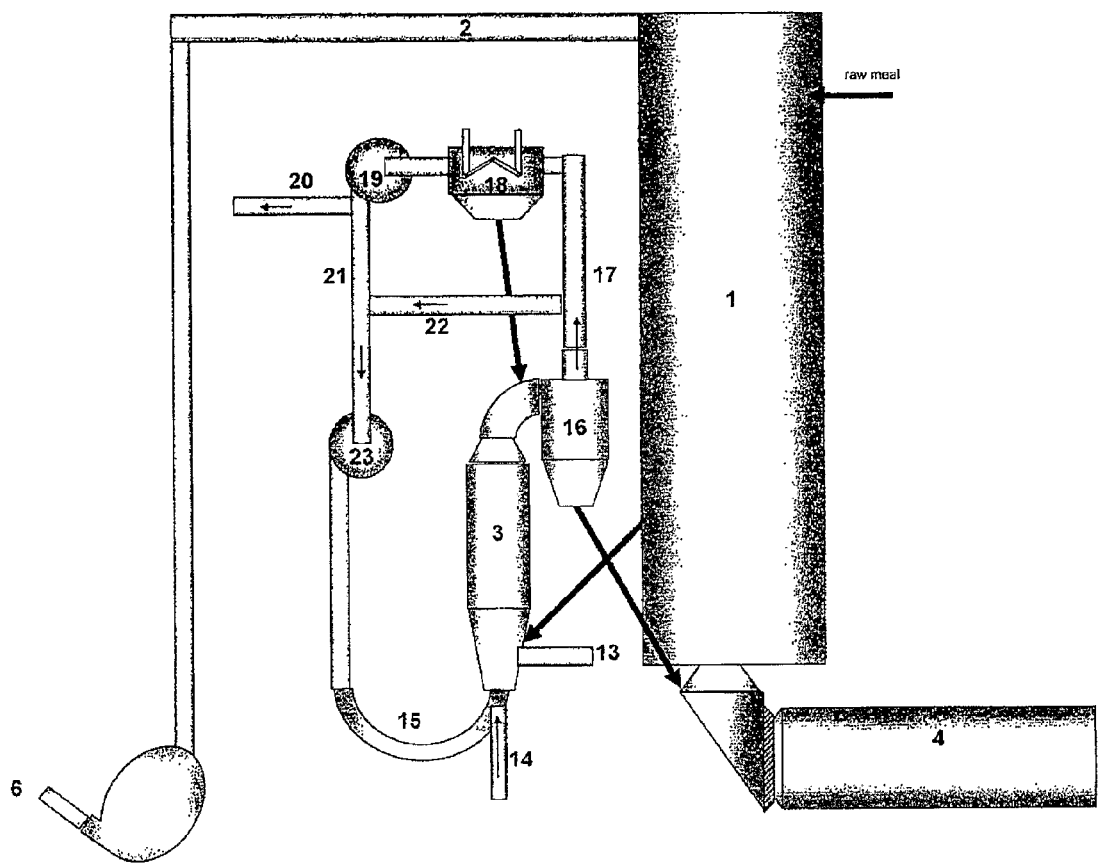
FIG. 3 illustrates in more detail the arrangement of a calciner for carrying out a process according to the invention.

Referring to FIG. 3, components (1), (2), (3), (4) and (6) are as in FIGS. 1 and 2. Calciner fuel enters the calciner (3) via line (13). Oxygen is injected via line (14). Recirculated carbon dioxide-containing gas is fed to the calciner (3) via line (15). Gases and precalcined meal leave the calciner (3) and pass to a cyclone (16). Precalcined meal passes from the cyclone (16) to the kiln (4). Separated carbon dioxide-containing gas leaves the cyclone (16) via line (17). The gas in line (17) is separated into two streams. A first stream in line (17) passes to a steam heater (18) and then to an exchanger fan (19). Gas leaving the exchanger fan (19) is split into two streams. A first stream from the exchanger fan (19) leaves along line (20). This first stream leaving along line (20) is the desired carbon dioxide-enriched gas from the process according to the invention. A second stream of gas from the exchanger fan (19) passes along line (21). A second gas stream from line (17) passes along line (22) to line (21). The combined gas streams from lines (21) and (22) pass via recirculation fan (23) and line (15) to calciner (3).

Figure 4:
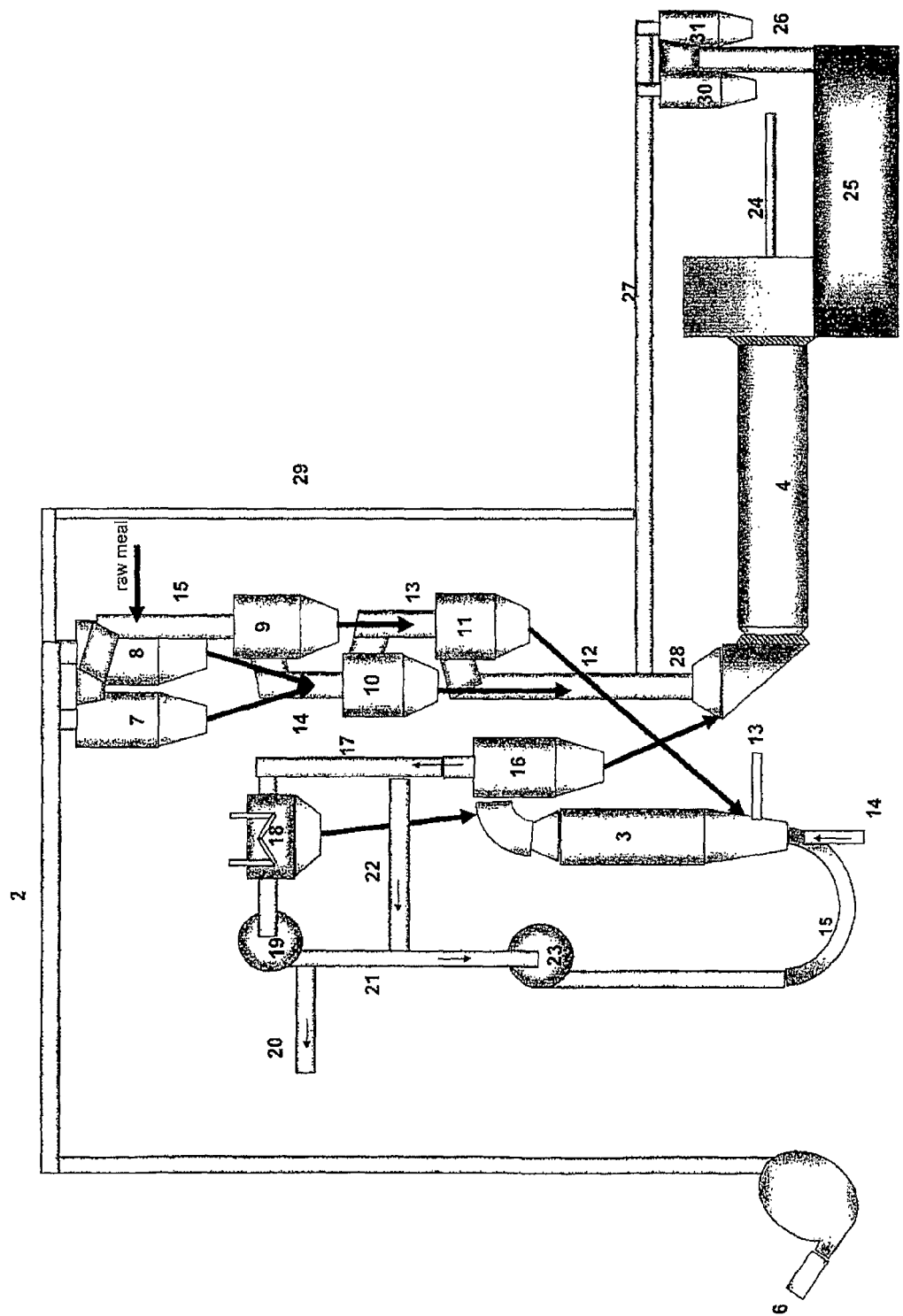
FIG. 4 illustrates a cement clinker-producing plant incorporating the preheater illustrated in FIG. 2 and the calciner illustrated in FIG. 3 for carrying out a process according to the invention.

Referring to FIG. 4, a cement plant incorporating the components of FIGS. 1, 2 and 3 is illustrated. Kiln fuel passes to the kiln (4) along line (24). Clinker produced in the kiln (4) passes to the clinker cooler (25). Waste gas leaves the clinker cooler (25) along lines (26) and (27). The gas stream in line (27) is divided into two streams. A first stream is used to cool gases leaving the kiln (4) along line (28). The temperature of hot gas passing to the preheater (3) is controlled by adjusting the gas flows along lines (27) and (28). A second stream (29) passes into line (2) and is used for drying raw material in the mill producing raw meal.

The invention also provides a cement-producing plant for operation, or operating, in accordance with the process of the invention; cement produced by a cement-producing plant according to the invention; and a cement-producing plant and process according to the invention substantially as herein described with reference to one or more of FIGS. 1 to 4 of the accompanying drawings.

In this specification and the accompanying claims, unless otherwise specified: temperatures are those measured in known manner during the process for the production of cement, for example by thermocouple or pyrometry; and gas percentages are by volume.

The following Example illustrates, but does not limit, the invention.

Example

Raw meal is ground and the ground meal is then fed to the top of preheater (1). The preheater comprises a series of cyclones (7) to (11) and connection ducts (12), (13), (14) and (15) (the risers). The preheater (1) receives hot gas from the kiln. The raw meal is heated as the gases are cooled in the risers and the cyclones (7 to 11) capture the meal so that it can be fed to the next lower stage.

The gases that pass through the preheater (1) are from the kiln (4) only. Gases from the calciner (3) are kept in a separate stream.

When the raw meal exits the lowest stage of the preheater (1) it is passed to the calciner (3) with a temperature of about 750° C. to 800° C. At this stage the level of pre-calcination will be less than about 10 percent as the temperature is kept below 800° C. As gases leave the kiln (4) at about 1100° C., cooler exhaust gas (from the clinker cooler) at about 400° C. to 500° C. can be added at this point before the gas is fed to the preheater (1), in order to reduce the temperature and maintain a low level of pre-calcination. The gases leaving the top of the preheater (1) have a temperature of about 300° C. and a carbon-dioxide level of around 18 percent by volume. They can be used to supplement the raw material drying step if necessary.

Raw meal enters the calciner (3) and is dispersed in the inlet gases which have been recirculated from the calciner exit after partial cooling, and in the injected oxygen. As the aim is to have a high concentration of carbon dioxide in the waste gases, oxygen is used for combustion of the calciner fuel instead of air which contains a substantial quantity of nitrogen. The flow of fuel to the calciner (3) is controlled to provide a constant outlet gas temperature in order to maintain a consistent precalcination which is desirable for kiln stability.

The precalcination level of the raw meal is controlled to around 92% to avoid any build up difficulties in the calciner (3). The precalcined raw meal is collected after the calciner in cyclone (16) and then passed to the kiln (4). It is an advantage to use a normal coal that has a low nitrogen content to minimise contamination of the outlet gases. After the calciner cyclone (16), part of the gases which contain more than 90% by volume of carbon dioxide are recycled to the calciner inlet via line (15) and the remaining gas is then cooled for downstream handling. Cooling is achieved by use of a heat exchanger comprising a steam heater (18) in order to help minimise false air ingress into the process. Operation of the system at a slight negative pressure also helps in this respect. Electric power can be generated using steam from the heat exchanger. After the heat exchanger some of the gases are recycled to the precalciner inlet to control the temperature in the recirculation fan and the rest are passed on for downstream treatment.

The raw meal entering the kiln forms cement clinker in the normal way. The clinker cooler operates in known manner except that the quantity of gas and temperature is somewhat higher than normal as no tertiary air from the kiln (4) is used for the calciner (3). Some gas from the clinker cooler (25) can be used to cool the kiln gas before it passes to the preheater and the remainder can be used for raw material drying.

The invention claimed is:

1. A process for the production of cement, the process comprising: calcining calcium carbonate-containing raw meal in a calciner heated by combustion of a carbon-containing fuel with a gas comprising oxygen and from 0 to 80% by volume of carbon dioxide, and substantially free of nitrogen, and isolating the carbon dioxide gas produced by combustion and calcination in the calciner.

2. The process according to claim 1, wherein the combustion is effected with a gas comprising from 90 to 100% of oxygen.

3. The process according to claim 1, wherein the raw meal is introduced into the calciner at a plurality of points.

4. The process according to claim 1, wherein the supplied gas is introduced into the calciner at a plurality of points.

5. The process according to claim 1, wherein oxygen and carbon dioxide in the supplied gas are introduced separately into the calciner.

6. The process according to claim 1, wherein the effluent gas comprises at least 90% of carbon dioxide.

7. The process according to claim 1, wherein the level of calcination in the calciner is controlled to 80% or more by weight leaving up to 20% residual carbon dioxide in the meal.

8. The process according to claim 1, wherein the calciner is operated at a reduced gas pressure of less than 1 millibar relative to the gas pressure in the kiln.

* * * * *